United States Patent
Iimura et al.

(10) Patent No.: US 10,156,847 B2
(45) Date of Patent: Dec. 18, 2018

(54) AUTONOMOUS MOVING DEVICE

(71) Applicant: HITACHI, LTD., Tokyo (JP)

(72) Inventors: Taiki Iimura, Tokyo (JP); Kenjiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/328,783

(22) PCT Filed: Jul. 25, 2014

(86) PCT No.: PCT/JP2014/069635
§ 371 (c)(1),
(2) Date: Jan. 24, 2017

(87) PCT Pub. No.: WO2016/013095
PCT Pub. Date: Jan. 28, 2016

(65) Prior Publication Data
US 2017/0212518 A1    Jul. 27, 2017

(51) Int. Cl.
*G05D 1/02* (2006.01)
*G06K 9/00* (2006.01)
*G06K 9/62* (2006.01)

(52) U.S. Cl.
CPC ....... *G05D 1/0214* (2013.01); *G06K 9/00664* (2013.01); *G06K 9/00805* (2013.01); *G06K 9/6262* (2013.01)

(58) Field of Classification Search
CPC .... G06Q 10/02; G05D 1/0217; G05D 1/0022; G05D 1/0214; G01C 21/3469
USPC ......................................................... 701/26
See application file for complete search history.

(56) References Cited

U.S. PATENT DOCUMENTS

| | | | |
|---|---|---|---|
| 9,523,984 B1 * | 12/2016 | Herbach | B62D 15/025 |
| 2005/0131581 A1 | 6/2005 | Sabe et al. | |
| 2014/0358353 A1 * | 12/2014 | Ibanez-Guzman | G05D 1/0027 701/23 |

FOREIGN PATENT DOCUMENTS

| | | |
|---|---|---|
| JP | 2004-042148 A | 2/2004 |
| JP | 2005-092820 A | 4/2005 |
| JP | 2012-187698 A | 10/2012 |
| WO | 2014/091611 A1 | 6/2014 |

OTHER PUBLICATIONS

International Search Report, PCT/JP2014/069635, dated Oct. 21, 2014, 2 pgs.

* cited by examiner

*Primary Examiner* — Muhammad Shafi
(74) *Attorney, Agent, or Firm* — Volpe and Koenig, P.C.

(57) ABSTRACT

An autonomous moving device includes a database that stores information on which objects are necessary to avoid and which are not necessary to avoid. When the autonomous object travels, an object detection unit detects an object on the road by using a sensor; a collation unit collates the detected object on a road surface with an object stored in the database; a determination input unit receives an input of an operator regarding whether or not to avoid the object where there is no data which is the same as or similar to the object in the database as a result of collation which is performed by the collation unit; and an operation generation unit commands the next operation of the moving object, based on the result of collation which is performed by the collation unit and the determination unit.

5 Claims, 5 Drawing Sheets

AUTONOMOUS MOVING DEVICE

TECHNICAL FIELD

The present invention relates to a technology of performing avoidance determination of an obstacle when a moving object such as a robot or a vehicle performs autonomous moving.

BACKGROUND ART

In the related art, various types of devices have been proposed which perform avoidance determination of an obstacle, based on a value of a sensor such as a camera, a laser sensor, or an ultrasonic sensor, which is mounted in moving object such as a robot or a vehicle.

For example, PTL 1 (JP-A-2004-42148) discloses a moving robot which autonomously moves in a movement environment using battery driving, including environmental map storage means that stores a movement environmental map in which a known obstacle is described; self-location orientation detection means that detects a self-location and orientation; obstacle detection means that detects an unknown obstacle; moving means that moves a moving robot according to a movement command when receiving a movement command, and that moves the movement robot until the obstacle detection means does not detect an unknown obstacle when receiving an avoidance command; and path planning means that plans a path which avoids the known obstacle from self-location that the self-location orientation detection means detects to a movement destination with reference to the environmental map, provides the planned path to the moving means as a movement command, provides a avoidance command to the moving means when the obstacle detection means detects an unknown obstacle, replans a path which avoids the known obstacle from self-location that the self-location orientation detection means detects to a movement destination with reference to the environmental map, at that time when the obstacle detection means does not detect an unknown obstacle, and provides the replanned path to the movement means as a movement command. According to PTL 1, even if there are lots of obstacles in a movement environment, there is a high probability that a moving robot can reach a movement destination regardless of whether an obstacle is known or unknown.

In addition, PTL 2 (JP-A-2012-187698) discloses a travelling robot that represents path information by using a sequence in which a path and a landmark are included as elements, represents a path by using an orbit that connects a start position to an end position, navigation which is configured with forward, backward, spin turn, tracking travelling after a mark, and stop, information on a sign pattern for correcting a lateral deviation from the orbit, information on an end position sign pattern for correcting position shift in a vertical direction of the orbit, a travelling speed, a width of a passage, and the like, and generates the path information according to teaching of an operator, that is, by moving the travelling robot along the path. In the travelling robot, when being blocked by an obstacle or coming into contact with an entrance, a fence, or the like during travelling based on information on the path from a start point to a destination point, appropriate retravelling is automatically selected by information that an obstacle detection system transmits or is selected by a user, or when coming to a position in construction of a road, retravelling configured by tracking travelling according to the guide of a construction worker is inserted, and travelling is continued based on interrupted path information if problems are solved. According to PTL 2, testing is performed by changing standard path information using teaching without changing software, and if there is a failure, improvement can be made by teaching or redoing, and thus, effort and labor are significantly reduced. In addition, by creating a library of the standard path information, know-how of a visually impaired person or a walking trainer who walks alone on a daily basis can be accumulated.

CITATION LIST

Patent Literature

PTL 1: JP-A-2004-42148
PTL 2: JP-A-2012-187698

SUMMARY OF INVENTION

Technical Problem

An obstacle avoiding technology of the related art is a method of generating an operation such that an area with a height is avoided, if the height from a road surface to the top of an object on the road surface is detected by, for example, a distance sensor or the like and the height is greater than or equal to a predetermined value. Furthermore, since operation content is changed depending on content of an obstacle, there is also a method in which an obstacle detection sensor such as a camera detects an object that may be an obstacle, a database in which information on an obstacle to be avoided such as a human being or a vehicle that is previously stored by a moving object is registered is collated with object information which is detected by the obstacle detection sensor, it is determined whether or not the detected object is an obstacle registered in the database, and a next operation is generated based on the determination results.

According a moving robot disclosed in PTL 1, an environmental map in which a known obstacle is described is stored, a detected obstacle is compared with the environmental map, it is determined whether the detected obstacle is the known obstacle which is described in the environmental map or an unknown obstacle which is not described in the environmental map, and if the detected obstacle is the unknown obstacle, an operation of newly describing in the environmental map is repeated, and thus, there is a high probability that the moving robot reaches a destination even in a movement environment in which there are lots of known obstacles or unknown obstacles.

However, since there are lots of loss or movement of the known obstacle in an outdoor environment in which an environment greatly changes, it is difficult to generate an operation, based on a location of an obstacle of the environmental map.

In PTL 2, retravelling of a travelling robot, a teaching method thereof, and a control method thereof pause if the travelling robot reaches the detected obstacle, and a space for avoiding the obstacle is detected on a right side or a left side. Hence, in a case where there is a space for avoiding the obstacle, the travelling robot asks a user whether to avoid the obstacle or wait until the obstacle retreats. In a case where there is no space for avoiding the obstacle, the travelling robot continues the pause until the obstacle retreats, and thus, it is possible to generate an operation with respect to an obstacle even at an outdoor place.

However, since there are lots of unknown and avoidance-needless objects on a road surface such as grass or a small branch of a tree in actual indoor and outdoor environments, whenever the object on a road surface is detected, the travelling robot pauses and causes a user to determine whether to avoid the obstacle or not, and thereby, there are problems in which movement of a pedestrian is disturbed if the obstacle is on a sidewalk, and movement of a vehicle is disturbed if the obstacle is on a street, and efforts of a user also increase.

The present invention aims for providing an autonomous moving device which is a moving object that autonomously moves in indoor and outdoor places, reduces burden of a user, and can appropriately determine whether to avoid an object on a road surface or not.

Solution to Problem

In order to solve the above problems, a representative autonomous moving device of autonomous moving devices according to the present invention includes a database that stores information on which avoiding an object is needful and information on which avoiding the object is needless, when an autonomous moving object travels; an object detection unit that detects an object on a road surface in the periphery of the moving object by using a sensor which is included in the moving object; a collation unit that collates a detected object on a road surface with an object which is stored in the database; a determination input unit that receives an input of determination of avoidance need and needlessness with respect to the object on a road surface from an operator, in a case where data which is the same as or similar to the object on a road surface is not in the database as a result of collation which is performed by the collation unit; and an operation generation unit that commands a next operation of the moving object, based on the result of collation which is performed by the collation unit or determination results of avoidance need and needlessness which are input by the determination input unit.

Advantageous Effects of Invention

According to an autonomous moving device of the aforementioned form, the present invention aims for providing an autonomous moving device which is a moving object that autonomously moves in indoor and outdoor places, reduces burden of a user, and can appropriately determine whether to avoid an object on a road surface or not.

DESCRIPTION OF EMBODIMENTS

Hereinafter, an embodiment will be described with reference to the drawings.

Embodiment 1

In the present embodiment, when a moving object, such as a vehicle or a robot autonomously moves indoor and outdoor places, an autonomous moving device according to the present invention in which a sensor that detects an object on a road surface is mounted determines avoidance need and needlessness of the object on a road surface in the same manner as a human being, and generates a next operation, based on the determination results. Accordingly, it is possible to perform autonomous movement with improved affinity with the human being.

Figure 1:
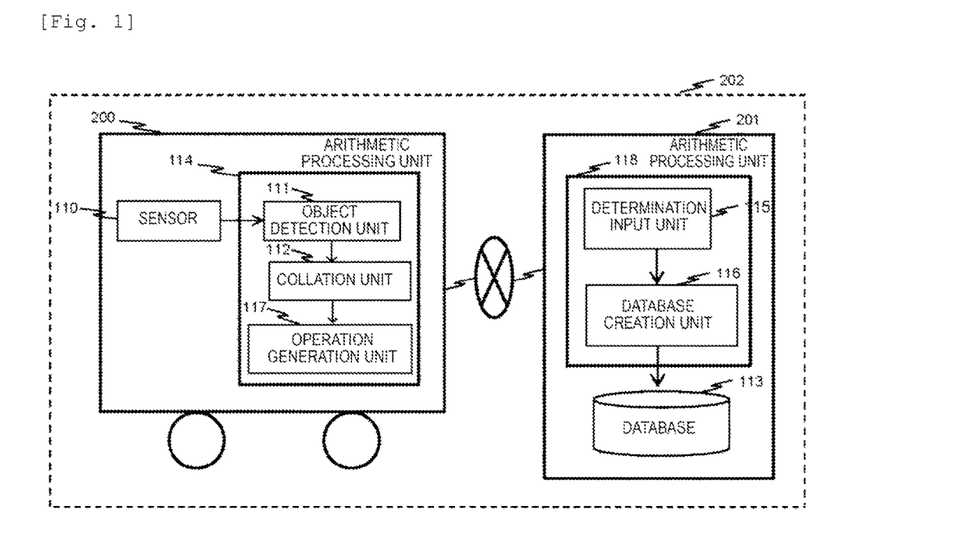
FIG. 1 is a block diagram illustrating configurations of a moving object and a database management system according to a form of Embodiment 1.

FIG. 1 illustrates a configuration of a moving object 200 and a configuration of a database management system 201 according to the present embodiment. A sensor 110 is mounted in the moving object 200, and various control programs are executed by an arithmetic processing unit 114. In FIG. 1, a program that is executed by the arithmetic processing unit 114 is illustrated as a functional block diagram, and specifically, the arithmetic processing unit 114 is configured by an object detection unit 111, a collation unit 112, and an operation generation unit 117. The database management system 201 includes a database 113 which stores object-on-road-surface information including avoidance need and needlessness information, and an arithmetic processing unit 118 which executes various programs. In the same manner as the arithmetic processing unit 114, a program which is executed by the arithmetic processing unit 118 is illustrated as a functional block diagram in FIG. 1, and specifically, the arithmetic processing unit is configured with a determination input unit 115 and a database creation unit 116. An autonomous moving device 202 is configured with the moving object 200 and the database management system 201.

The moving object 200 can communicate with the database management system 201 through wireless communication means all the time. It is preferable that the communication means is a wireless local area network (LAN), but the communication means may use other communication means.

Means which calculates a self-location is mounted in the moving object 200 in addition to the sensor 110. For example, an encoder is provided in a wheel portion of the moving object, and a wheel odometry uses a method of calculating relative coordinates of the moving object by using an arbitrary point as a reference, based on the number of rotation of the wheel. In addition, a gyroscope or an inertial measurement unit (IMU) is provided in the moving object, and a gyro odometry uses a method of calculating relative coordinates of the moving object by using an arbitrary point as a reference, based on angular acceleration and translational acceleration when moving. In addition, since an error of a self-location which is calculated according to a moving distance increases in the wheel odometry or the gyro odometry, an error caused by the odometry may be prevented from increasing by using map-matching that is a method of calculating the self-location by matching a shape of ambient environment with an environmental map which are measured by using a distance measuring sensor, such as a camera, a laser, or radar. A navigation satellite system (NSS) may be used to calculate an absolute location. Furthermore, it is assumed that a measured value obtained by each sensor provided in the moving object and the amount of moving of the moving object have Markov properties, and measurement results obtained by the odometry, the map-matching, or satellite measurement may be fused by a Kalman filter. In addition, a system which employs simultaneous localization and mapping (SLAM) that is a method of simultaneously performing generation and updating of an environmental map and calculation of self-location may be mounted.

The object detection unit 111 detects an object on a road surface, using the sensor 110. It is preferable that the sensor 110 can detect height from a road surface or a relative location from the moving object, using a distance measuring sensor, such as a camera, a laser, or radar.

The collation unit 112 collates the object on a road surface which is detected by the object detection unit 111 with the database 113 which is managed by the database management system 201, and confirms whether or not there is data which coincides with the detected object on a road surface, among the data stored in the database 113. In a case where there is data which coincides with the detected object, the moving object determines whether to avoid the object on a road surface which is detected from avoidance need and needlessness information of the coinciding data or not, and the processing moves to the operation generation unit 117. In a case where there is no coinciding data, the processing moves to the determination input unit 115. Details of the database 113 will be described with reference to FIG. 2, and details of the collation unit 112 will be described with reference to FIG. 3.

The determination input unit 115 outputs collation results of the collation unit 112 to a monitor, and an operator for the database management system. 201 performs avoidance determination of the detected object on a road surface, based on the collation results which are output to the monitor. It is preferable that the operator is a human being which is familiar with the autonomous moving device 202. After the operator performs the avoidance determination, the avoidance determination results are transmitted to the database creation unit 116 and the operation generation unit 117 of the moving object 200.

The database creation unit 116 receives the avoidance determination results of the determination input unit 115, and updates the database 113, based on the avoidance determination results.

The operation generation unit 117 determines whether to avoid the detected object on a road surface, based on the collation results of the collation unit 112 or the avoidance determination results of the determination input unit 115, and in a case where avoidance is needful, the moving object takes an avoidance action, and in a case where the avoidance is needless, the moving object keeps travelling without taking the avoidance action.

Figure 2:
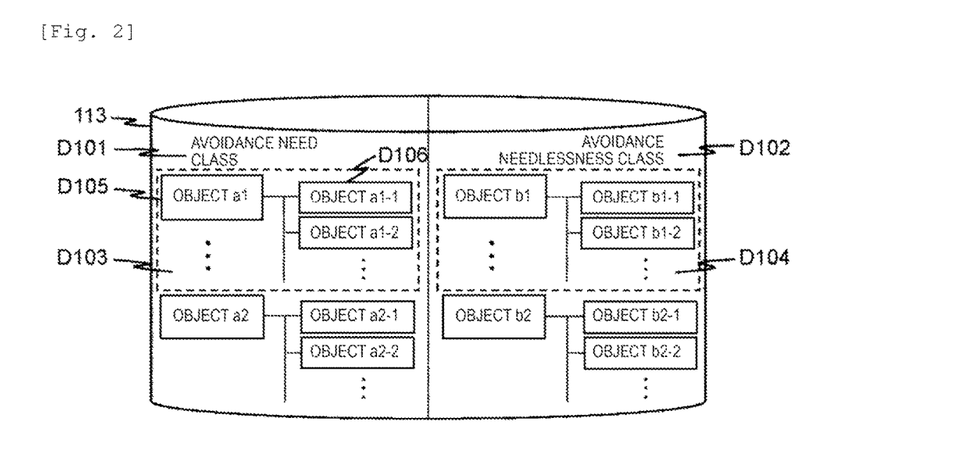
FIG. 2 is a diagram illustrating a database for avoidance determination according to the form of Embodiment 1.

FIG. 2 illustrates details of the database 113 of FIG. 1.

The database 113 is configured with an avoidance need class D101 in which object information on avoidance need is registered, and an avoidance needlessness class D102 in which object information on avoidance needlessness is registered.

The avoidance need class D101 includes a data group D103 in which similar objects that need to be avoided are collected, as an element.

The avoidance needlessness class D102 includes a data group D104 in which similar objects that do not need to be avoided are collected, as an element.

The data group D103 and the data group D104 are configured with representative data D105 and sub-data D106 which is associated with the representative data D105.

Forms of the representative data D105 and the sub-data D106 become different according to the sensor 110 of FIG. 1. In a case where the sensor 110 is a camera, the representative data D105 and the sub-data D106 are captured images of an object on a road surface, or characteristic information on the captured images. The characteristic information is location-on-captured-image information on a characteristic point which is detected by applying, for example, a harris detector, a smallest univalue segment assymilating nucleus (SUSAN) detector, a features from accelerated segment test (Fast), or the like to the capture image, and a characteristic amount which is extracted by applying oriented-BRIEF (ORB) or the like to the characteristic point, but as long as the characteristic point is detected and the characteristic amount of the characteristic point is extracted, any type of a characteristic point detecting method and a characteristic amount extracting method may be used.

The representative data D105 is set as data which is obtained by calculating a degree of coincidence with all data of the data group D103, based on the characteristic information, and then, setting a sample average of the degree of coincidence to be maximum. The degree of coincidence is obtained by calculating, for example, an Euclidean distance, a Mahalanobis distance, a correlation coefficient, or a determination coefficient of the characteristic amount of two pieces of data which is collated, but as long as a calculating method represents approximation, any method may be used.

In addition, the sample average of the degree of coincidence is added to each data, and information on the sample average of the degree of coincidence is used by the determination input unit 115 of FIG. 1.

IDs are respectively allocated in the representative data D105 and the sub-data D106. For example, IDs of each representative data of the avoidance need class D101 are referred to as ai (i=1, 2, . . . ), and IDs of sub-data whose IDs are associated with the representative data of ai are referred to as ai–j (j=1, 2, . . . ). In the same manner, IDs of each representative data of the avoidance needlessness class D102 are referred to as bi (i=1, 2, . . . ), and IDs of sub-data whose IDs are associated with the representative data of bi are referred to as bi–j (j=1, 2, . . . ), but as long as need and needlessness of avoidance, representative data and sub-data, and association of the representative data and the sub-data are clear, the IDs may be allocated in various types.

Figure 3:
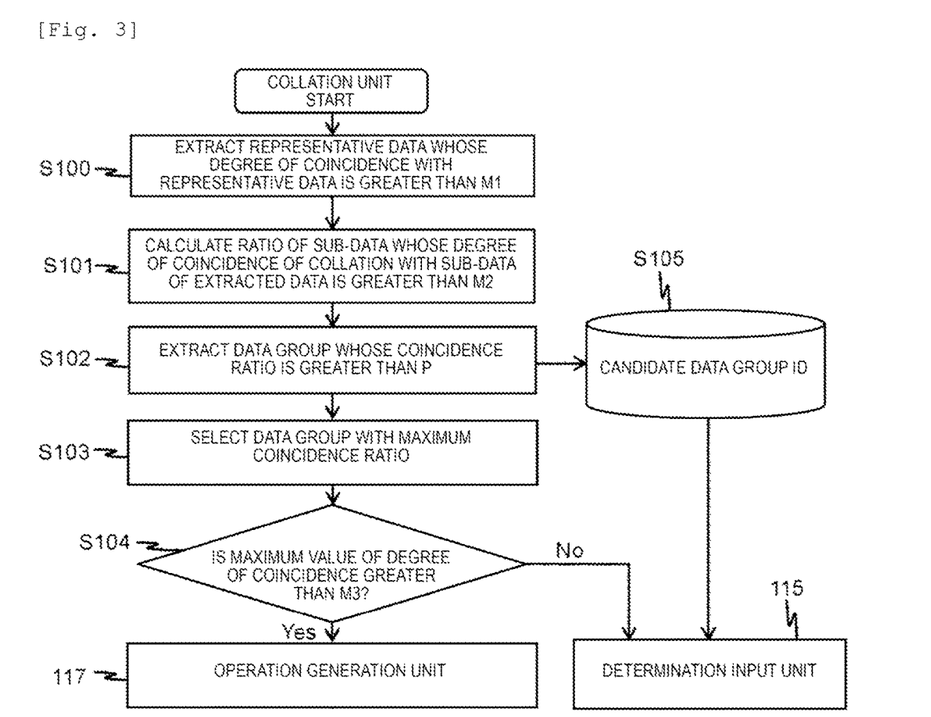
FIG. 3 is a flowchart of a collation unit according to the form of Embodiment 1.

FIG. 3 illustrates details of the collation unit 112 of FIG. 1.

In S100, an object on a road surface which is detected by the object detection unit 111 of FIG. 1 is collated with the entire representative data registered in the database 113 of FIG. 1, and each degree of coincidence is calculated. Furthermore, representative data whose calculated degree of coincidence is greater than a threshold value M1 is extracted.

In S101, the detected object on a road surface is collated with sub-data of the entire representative data which is extracted in the process S100, and each degree of coincidence is calculated. Furthermore, the number of pieces of sub-data whose calculated degree of coincidence is greater than a threshold value M2 is counted, and a coincidence ratio of the counted sub-data that occupies in a data group is calculated.

In S102, a data group in which the coincidence ratio calculated in S101 is greater than a threshold value P is extracted as a candidate data group, and an ID of the representative data of the extracted candidate data group is stored as a candidate data group ID (S105).

In S103, a data group in which the coincidence ratio calculated in step S101 is greatest among the candidate data groups which are extracted in step S102 is selected.

In S104, it is confirmed whether or not a maximum value of the coincidence degree of entire data of the data group which is selected in step S103 is greater than a threshold value M3. In a case where the maximum value of the coincidence degree is greater than the threshold value M3, the processing moves to the operation generation unit 117, and if the maximum value of the coincidence degree is less than the threshold value M3, the candidate data group ID (S105) is transmitted to the determination input unit 115, and the processing moves to the determination input unit 115.

Figure 4:
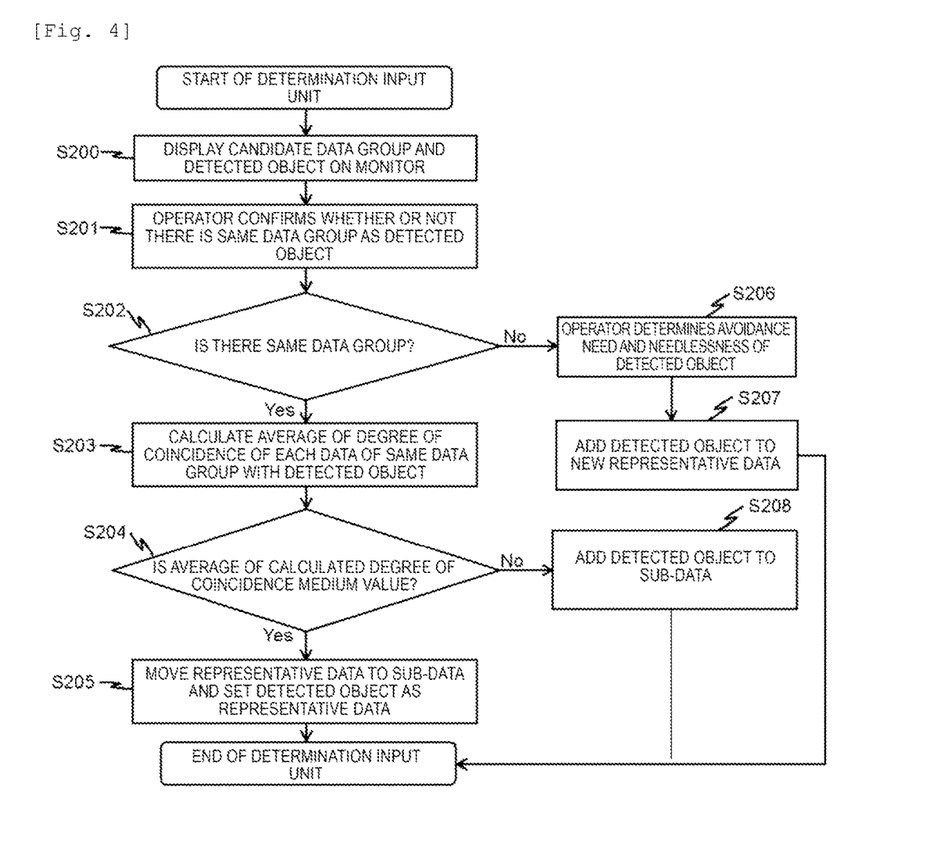
FIG. 4 is a flowchart of a determination input unit according to the form of Embodiment 1.
Figure 5:
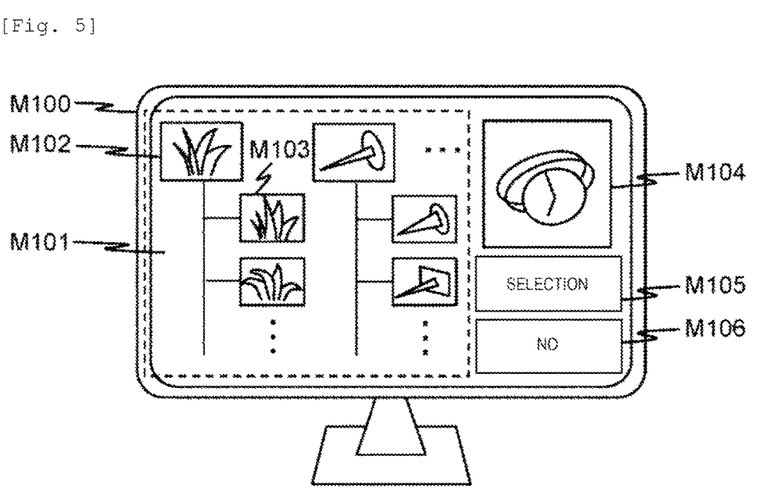
FIG. 5 is a diagram illustrating a display example of a monitor of the determination input unit according to the form of Embodiment 1.
Figure 6:
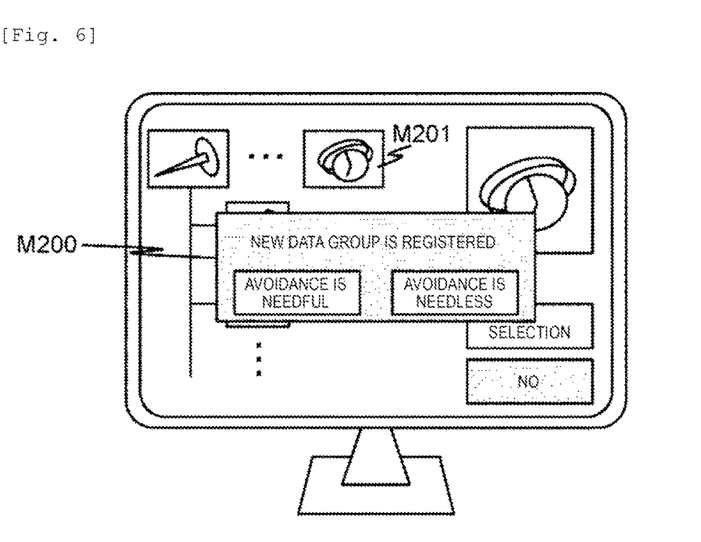
FIG. 6 is a diagram illustrating another display example of the monitor of the determination input unit according to the form of Embodiment 1.
Figure 7:
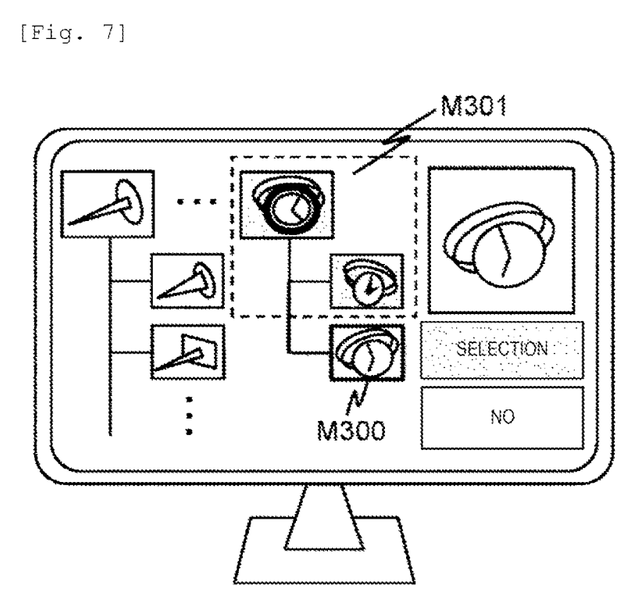
FIG. 7 is a diagram illustrating still another display example of the monitor of the determination input unit according to the form of Embodiment 1.

FIG. 4 illustrates details of the determination input unit 115 of FIG. 1. In addition, FIG. 5, FIG. 6, and FIG. 7 illustrate a monitor for displaying the collation results of the collation unit 112 of FIG. 1 to the operator by the determination input unit 115 of FIG. 1, and illustrate content of the monitor.

In S200, the candidate data group ID (S105) of FIG. 3 is received, the candidate data group stored in the database 113 of FIG. 2 is displayed on the monitor, based on the received candidate data group ID (S105), and furthermore, the object on a road surface detected by the object detection unit 111 of FIG. 1 is displayed on the monitor. For example, as illustrated in FIG. 5, representative data M102 and sub-data M103 of candidate data group M101 are visualized to be displayed on a monitor M100, and the visualized object on a road surface is displayed in M104. In a case where there are many candidate data groups M101, the M101 portion is set to be able to scroll vertically and horizontally. Furthermore, each of data M102 and M103 of the visualized candidate data group is set to be able to be selected.

In 201, the operator confirms whether or not there is the same data group as the object on a road surface detected by the object detection unit 111 of FIG. 1 in the candidate data group displayed on the monitor. For example, in a case where there is the same data group, the same data as the object on a road surface M104 is selected from the representative data M102 or the sub-data M103 in the candidate data group M101 of FIG. 5, and a "selection" button M105 is clicked. In addition, in a case where there is no same data group, a "no" button M106 is clicked.

In S202, in a case where the operator confirms that there is the same data group as the object on a road surface from the candidate data group in step S201, the processing moves to step S203, and in a case where the operator confirms that there is no same data group as the object on a road surface, the processing moves to step S206.

In S203, when it is confirmed that there is the same data group as the object on a road surface in step S202, a degree of coincidence of the object on a road surface with the data of the same data group is calculated, and a sample average of the calculated degree of coincidence is calculated.

In S204, in a case where the sample average of the degree of coincidence of the object on a road surface which is calculated in step S203 takes a medium value in the same data group, the processing moves to step S205, and in a case where the sample average does not take the medium value in the same data group, the processing moves to step S208.

In S205, in a case where the sample average of the degree of coincidence of the object on a road surface takes a medium value in the same data group in S204, the representative data of the same data group is moved to sub-data, and the object on a road surface is set to representative data. At this time, for example, IDs of sub-data are set to be from ai−1 to ai−j, and an ID of original representative data which is moved to the sub-data is changed from ai to ai−(j+1).

In S206, when it is confirmed that there is no same data group as the object on a road surface in step S202, the operator determines whether avoiding the object on a road surface is needful or needless.

In S207, in a case where the operator determines that avoiding the object on a road surface is needful in step S206, a new data group is generated in the avoidance need class D101 in FIG. 2, and the object on a road surface is added as representative data of the new data group. In a case where the operator determines that the avoiding the object on a road surface is needless in step S206, a new data group is generated in the avoidance needlessness class D102 in FIG. 2, and the object on a road surface is added as representative data of the new data group. At this time, for example, in a case where a new data group is generated in the avoidance need class D101, the ID of the representative data of the data group before being generated is set to be from al to ai, and the ID of the representative data of the new data group is set to be a (i+1). For example, if the "no" button M106 of FIG. 5 is clicked, a window M200 is displayed in which description of generating new data group is made as illustrated in FIG. 6. Furthermore, the window M200 displays an "avoidance need" button and an "avoidance needlessness" button, and the operator clicks a button that he or she determines. After clicking is performed, a newly added data group M201 is displayed.

In S208, in a case where the sample average of the degree of coincidence of the object on a road surface does not take the medium value in the same data group in step S204, the object on a road surface is added to the sub-data of the same data group. At this time, for example, the sub-data of the same data group is set to be from ai−1 to ai−j, and an ID of the object on a road surface which is added to the sub-data is set to be ai−(j+1). For example, if the operator selects a same data group M301 of FIG. 7 and clicks the "selection" button M105 of FIG. 5, an object on a road surface M300 is added to the same data group M301 to be displayed, as illustrated in FIG. 7.

According to the aforementioned configuration, the autonomous moving device of the present invention includes a database which is configured by the avoidance need and needlessness classes, determines whether to avoid a detected object on a road surface or not, thereby, performing the same avoidance determination as a human being, differently from an autonomous moving device of the related art. Accordingly, it is possible to realize movement with improved affinity with a human being.

In addition, since the database 113 is divided into the avoidance need class and the avoidance needlessness class, it is possible to obtain effects which can perform not only avoidance need determination of a detected object on a road surface but also avoidance needlessness determination of the detected object on a road surface. In addition, when the detected object on a road surface is collated with a database, the object is first collated with representative data, and thus, it is not necessary to collate with the entire data. Accordingly, it is possible to obtain effect that can reduce processing load of collation.

In addition, since not only the representative data but also sub-data similar to the representative data is used for the avoidance need and needlessness determination, even if appearance of an object on a road surface is changed due to a difference between sensing directions of an object detecting sensor, it is possible to obtain effects that can extract the same data as the object on a road surface from the database.

In addition, in a case where an object on a road surface is not in the database 113, an operator determines whether avoidance is needful or needless, and thus, it is possible to obtain effects that can perform avoidance determination necessarily with respect to various objects on a road surface. In addition, the operator sequentially reflects the determination results to the database, and thus, it is possible to reduce the number of objects on a road surface whose avoidance determination cannot be done automatically.

The present invention is not limited to the aforementioned embodiment, and includes various modification examples. For example, the aforementioned embodiment is described in detail such that the present invention is easily understood, and is not intended to be limited to a device including the entire configurations described above. In addition, each configuration, each function, each processing unit, each processing means, and the like which are described above may be realized by hardware by designing a part of the entirety thereof using, for example, an integrated circuit or the like. In addition, each configuration, each function, and the like which are described above may be realized by software by interpreting and executing a program by which a processor realizes each function. Information on a program, a table, a file, or the like which realizes each function can be stored in a recording device such as a memory, a hard disk, or a solid state drive (SSD), or a recording medium such as an IC card, an SD card, or a DVD.

REFERENCE SIGNS LIST

110: SENSOR
111: OBJECT DETECTION UNIT
112: COLLATION UNIT
117: OPERATION GENERATION UNIT
200: MOVING OBJECT
113: DATABASE
115: DETERMINATION INPUT UNIT
116: DATABASE CREATION UNIT
201: DATABASE MANAGEMENT SYSTEM
202: AUTONOMOUS MOVING DEVICE

The invention claimed is:

1. An autonomous moving device comprising:
 a communication interface that is communicatively coupled to a database management system via a wireless network, wherein the database management system includes a database that stores information on which avoiding an object is needful and information on which avoiding the object is needless;
 a sensor that detects an object on a road surface in a periphery of a moving object; and
 a processor communicatively coupled to the communication interface and the sensor, wherein the processor:
  detects, using the sensor, a detected object on the road surface,
  transmits, using the communication interface, an image of the detected object to the database management system,
  receives, from the database management system, a command, wherein the command indicates whether object avoidance is required, and
  controls the autonomous moving device according to the command;
 wherein in response to receiving the image of the object, the database management system:
  determines whether a classification group for the object is known based on the information stored in the database,
  on a condition that the classification group of the object is known, transmits the command to the autonomous moving device based on the classification group, and
  on a condition that the classification group of the object is unknown, receives an input from a user of the database management system that indicates whether avoiding the object is needed, stores the input in the database as the classification group for the object, and transmits the input as the command to the autonomous moving device.

2. The autonomous moving device according to claim 1, wherein the database is configured with a avoidance need class that stores information on which avoiding the object on the road surface is needful and an avoidance needlessness class that stores information on which avoiding the object on the road surface is needless, and an amount of characteristics which are able to be used for comparing characteristics of the object is defined in the information on each object, and
wherein each of the avoidance need class and the avoidance needlessness class has a data group that is configured by representative data which is information on an object that is representative of the data group, and sub-data which is information on an object similar to characteristics of the representative data and is associated with the representative data, as an element.

3. The autonomous moving device according to claim 2, wherein the sensor detects the object on the road surface and is compared with each representative data of the database, and extracts a plurality of pieces of the representative data similar to the object on the road surface,
wherein the sensor further detects the object on the road surface with the sub-data that is associated with each representative data that is extracted, and extracts the data group with a high rate of the data similar to the object on the road surface as a candidate data group,
determines avoidance need and needlessness classes which involve the candidate data group, in a case where the amount of characteristics of the representative data or the sub-data in the candidate data group which is extracted is within a predetermined difference between the amount of characteristics of the representative data or the sub-data and the amount of characteristics of the object on the road surface,
transmits, using the communication interface, information on the candidate data group to the database management system, in a case where the amount of characteristics of the representative data or the sub-data in the candidate data group which is extracted is also not within the predetermined difference between the amount of characteristics of the representative data or the sub-data and the amount of characteristics of the object on the road surface, and
wherein the information on the candidate data group and the object on the road surface is displayed for an operator, and receives, from the database management system, the command, the avoidance need and needlessness determination with respect to the object on the road surface from the operator.

4. The autonomous moving device according to claim 3, wherein the candidate data group and the object on the road surface is displayed on a monitor, when receiving information on the candidate data group from the sensors, wherein the database management system receives absence or presence of a same data group type as the object on the road surface in the candidate data group which is displayed on the monitor, from the operator, wherein, in a case where there is the same data group type as the object on the road surface, the database management system adds information on the object on the road surface to the data group, and determines whether avoiding the object on the road surface is needful or needless, based on information of avoidance need and needlessness classes that involve the data group, and wherein, in a case where there is not the same data group type as the object on the road surface, the database management system receives avoidance determination of the object on the road surface from the operator, adds the information on the object on the road surface to the database as representative data, based on results of the avoidance determination, and determines avoidance need and needlessness, based on the determination results.

5. The autonomous moving device according to claim 1, wherein the sensor and the processor are included in the moving object, and wherein the database management system includes the database and a server which can communicate with the moving object.

* * * * *